United States Patent
Lacy et al.

(10) Patent No.: US 9,416,675 B2
(45) Date of Patent: Aug. 16, 2016

(54) SEALING DEVICE FOR PROVIDING A SEAL IN A TURBOMACHINE

(71) Applicant: General Electric Company, Schenectady, NY (US)

(72) Inventors: Benjamin Paul Lacy, Greer, SC (US); Srikanth Chandrudu Kottilingam, Simpsonville, SC (US); Christopher Donald Porter, Mauldin, SC (US); David Edward Schick, Greenville, SC (US); David Wayne Weber, Simpsonville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 139 days.

(21) Appl. No.: 14/164,707

(22) Filed: Jan. 27, 2014

(65) Prior Publication Data

US 2015/0211377 A1 Jul. 30, 2015

(51) Int. Cl.
*F01D 11/00* (2006.01)
*F16J 15/06* (2006.01)
*F16J 15/02* (2006.01)
*F01D 9/02* (2006.01)
*F16J 15/12* (2006.01)

(52) U.S. Cl.
CPC ............. *F01D 11/005* (2013.01); *F01D 9/023* (2013.01); *F01D 11/003* (2013.01); *F16J 15/02* (2013.01); *F16J 15/061* (2013.01); *F16J 15/126* (2013.01); *F05D 2240/11* (2013.01); *F05D 2240/55* (2013.01)

(58) Field of Classification Search
CPC ... F01D 11/005; F01D 9/023; F01D 2240/11; F01D 2240/55; F16J 15/02; F16J 15/061; F16J 15/0812; F16J 15/0887; F16J 15/122
See application file for complete search history.

(56) References Cited

U.S. PATENT DOCUMENTS

| | | | |
|---|---|---|---|
| 2,924,471 A | | 2/1960 | Poltorak et al. |
| 3,020,185 A | | 2/1962 | Moffitt, Jr. et al. |
| 3,476,842 A | | 11/1969 | Renwick |
| 3,914,490 A | | 10/1975 | Fusiek |
| 4,220,342 A | | 9/1980 | Shah |
| 4,226,429 A | | 10/1980 | Sato et al. |
| 4,318,668 A | | 3/1982 | Chaplin et al. |
| 4,462,603 A | | 7/1984 | Usher et al. |
| 4,465,284 A | * | 8/1984 | Szema .................. 277/628 |
| 4,540,183 A | | 9/1985 | Schneider et al. |
| 4,665,978 A | | 5/1987 | Luke |
| 4,902,198 A | | 2/1990 | North |

(Continued)

FOREIGN PATENT DOCUMENTS

| DE | 10037965 | 2/2002 |
|---|---|---|
| DE | 20023961 | 12/2007 |

(Continued)

*Primary Examiner* — Kristina Fulton
*Assistant Examiner* — Nicholas L Foster
(74) *Attorney, Agent, or Firm* — Dority & Manning, PA (57) ABSTRACT

Sealing device for providing seals between adjacent components, and turbomachines utilizing such sealing devices, are provided. A sealing device includes a seal plate insertable between the adjacent components, the seal plate comprising a first face and an opposing second face. The sealing device further includes a plurality of pins extending from one of the first face or the second face, the plurality of pins configured to space the one of the first face or the second face from contact surfaces of the adjacent components.

20 Claims, 7 Drawing Sheets

(56) References Cited

U.S. PATENT DOCUMENTS

| | | | |
|---|---|---|---|
| 4,990,544 A | 2/1991 | Asaumi et al. | |
| 5,167,485 A * | 12/1992 | Starkweather | F01D 11/005 415/115 |
| 5,209,503 A | 5/1993 | Heibel et al. | |
| 5,375,973 A | 12/1994 | Sloop et al. | |
| 5,407,214 A | 4/1995 | Lew et al. | |
| 5,509,669 A | 4/1996 | Wolfe et al. | |
| 5,527,599 A | 6/1996 | Hall et al. | |
| 5,649,806 A | 7/1997 | Scricca et al. | |
| 5,657,998 A | 8/1997 | Dinc et al. | |
| 5,705,541 A | 1/1998 | Awe et al. | |
| 5,705,916 A | 1/1998 | Rudbeck et al. | |
| 5,716,052 A | 2/1998 | Swensen et al. | |
| 5,823,741 A | 10/1998 | Predmore et al. | |
| 5,934,687 A | 8/1999 | Bagepalli et al. | |
| 5,957,657 A | 9/1999 | Akita et al. | |
| 5,975,844 A * | 11/1999 | Milazar et al. | 415/138 |
| 6,155,778 A | 12/2000 | Lee et al. | |
| 6,162,014 A | 12/2000 | Bagepalli et al. | |
| 6,446,979 B1 | 9/2002 | Steinetz et al. | |
| 6,453,726 B1 | 9/2002 | Gutierrez et al. | |
| 6,454,526 B1 | 9/2002 | Cunha et al. | |
| 6,632,070 B1 * | 10/2003 | Tiemann | 415/191 |
| 6,637,752 B2 | 10/2003 | Aksit et al. | |
| 6,648,333 B2 | 11/2003 | Aksit et al. | |
| 6,655,913 B2 | 12/2003 | Vedantam et al. | |
| 6,659,472 B2 | 12/2003 | Aksit et al. | |
| 6,692,227 B2 | 2/2004 | Tomita et al. | |
| 6,726,448 B2 | 4/2004 | McGrath et al. | |
| 6,764,081 B2 | 7/2004 | Mohammed-Fakir et al. | |
| 6,769,595 B2 * | 8/2004 | Stol et al. | 228/112.1 |
| 6,783,323 B2 | 8/2004 | Shiozaki et al. | |
| 6,786,048 B2 * | 9/2004 | Tiemann | 60/752 |
| 6,843,479 B2 | 1/2005 | Burdgick | |
| 6,883,807 B2 * | 4/2005 | Smed | 277/644 |
| 6,971,844 B2 | 12/2005 | Burdgick | |
| 7,029,228 B2 | 4/2006 | Chan et al. | |
| 7,033,138 B2 | 4/2006 | Tomita et al. | |
| 7,040,857 B2 | 5/2006 | Chiu et al. | |
| 7,076,957 B2 | 7/2006 | Ahmed et al. | |
| 7,153,379 B2 | 12/2006 | Millard et al. | |
| 7,168,914 B2 | 1/2007 | Shiozaki et al. | |
| 7,252,902 B2 | 8/2007 | Bram et al. | |
| 7,284,954 B2 | 10/2007 | Parker et al. | |
| 7,367,567 B2 | 5/2008 | Farah et al. | |
| 7,467,517 B2 | 12/2008 | Strain | |
| 7,562,880 B2 * | 7/2009 | Paprotna et al. | 277/644 |
| 7,788,932 B2 * | 9/2010 | Kunitake | F01D 9/023 60/797 |
| 7,901,186 B2 | 3/2011 | Cornett et al. | |
| 8,038,405 B2 | 10/2011 | Ward et al. | |
| 8,052,155 B2 | 11/2011 | Amos et al. | |
| 8,079,806 B2 | 12/2011 | Tholen et al. | |
| 8,128,100 B2 | 3/2012 | Bogue et al. | |
| 8,142,142 B2 * | 3/2012 | Zborovsky et al. | 415/185 |
| 8,163,436 B2 | 4/2012 | Larsen et al. | |
| 8,201,834 B1 * | 6/2012 | Liang | 277/637 |
| 8,231,128 B2 | 7/2012 | Morgan et al. | |
| 8,240,985 B2 | 8/2012 | Martin | |
| 8,287,234 B1 * | 10/2012 | Liang | 415/173.1 |
| 8,430,626 B1 * | 4/2013 | Liang | 415/139 |
| 8,511,982 B2 | 8/2013 | Hart et al. | |
| 8,585,354 B1 * | 11/2013 | Liang | 415/135 |
| 8,845,285 B2 * | 9/2014 | Weber | F01D 11/005 415/173.1 |
| 2002/0037952 A1 | 3/2002 | Zerfass | |
| 2003/0039542 A1 * | 2/2003 | Cromer | 415/135 |
| 2003/0089115 A1 * | 5/2003 | Gerendas | 60/796 |
| 2004/0051254 A1 * | 3/2004 | Smed | 277/628 |
| 2005/0040605 A1 | 2/2005 | Zerfass | |
| 2005/0179215 A1 * | 8/2005 | Kono | F01D 11/005 277/628 |
| 2005/0203236 A1 | 9/2005 | Prowell et al. | |
| 2005/0232772 A1 | 10/2005 | Race et al. | |
| 2007/0041827 A1 | 2/2007 | Camus | |
| 2009/0072497 A1 * | 3/2009 | Kunitake et al. | 277/641 |
| 2009/0229271 A1 | 9/2009 | De Ruyck et al. | |
| 2009/0285675 A1 | 11/2009 | Lewis et al. | |
| 2011/0052367 A1 | 3/2011 | Martin et al. | |
| 2011/0081235 A1 * | 4/2011 | Shah et al. | 415/170.1 |
| 2012/0133102 A1 | 5/2012 | Samudrala et al. | |
| 2012/0292861 A1 * | 11/2012 | Moehrle | F01D 9/023 277/641 |
| 2012/0292862 A1 | 11/2012 | Moehrle et al. | |
| 2012/0328419 A1 | 12/2012 | Riggi et al. | |
| 2013/0089414 A1 * | 4/2013 | Harding | 415/182.1 |
| 2013/0177383 A1 * | 7/2013 | Winn et al. | 415/1 |
| 2013/0207351 A1 * | 8/2013 | Milazar | 277/591 |

FOREIGN PATENT DOCUMENTS

| | | |
|---|---|---|
| EP | 2116621 | 11/2009 |
| JP | 2002372714 | 12/2002 |
| JP | 2007254563 | 10/2007 |

* cited by examiner

SEALING DEVICE FOR PROVIDING A SEAL IN A TURBOMACHINE

FEDERAL RESEARCH STATEMENT

This invention was made with Government support under contract number DE-FC26-05NT42643 awarded by the Department of Energy. The Government may have certain rights in the invention.

FIELD OF THE INVENTION

The present disclosure relates in general to a turbomachines, such as gas turbine systems, and more particularly to sealing devices for providing seals between adjacent components of such turbomachines.

BACKGROUND OF THE INVENTION

Turbomachines, such as turbine systems, are widely utilized in fields such as power generation. A conventional gas turbine system, for example, includes a compressor, a combustor, and a turbine. During operation of a turbine system, various components in the system are subjected to high temperature flows. Many of the components are disposed in annular arrays about an axis of the gas turbine system. Further, many of the components are positioned adjacent to other components, in annular arrays, radially, axially, or otherwise. For example, compressor and turbine blades, nozzles, and shroud assemblies are positioned in annular arrays and are further positioned adjacent to each other. Frequently, gaps exist between adjacent components. These gaps may allow for leakage of the high temperature flows from the hot gas path, resulting in decreased performance, efficiency, and power output of the turbine system.

Further, since higher temperature flows generally result in increased performance, efficiency, and power output of the turbine system, the components of the system must be cooled to allow the turbine system to operate at increased temperatures. Various strategies are known in the art for cooling various components. For example, a cooling medium may be routed to the components. However, the gaps between adjacent components may allow for leakage of the cooling medium and mixing with the high temperature flows, resulting in further decreased performance, efficiency, and power output of the turbine system.

Various strategies are known in the art to reduce turbine system losses due to leakage and mixing. For example, sealing mechanisms, such as leaf seals, spring seals, and pins, have been utilized to seal the gaps between various adjacent components. Such seals may provide adequate sealing. However, in many cases, it may be desirable to, while maintaining adequate sealing, flow a small portion of cooling medium around the seal to facilitate cooling of the seal and in the region of the seal. It is thus desirable to balance leakage and mixing concerns with regional cooling concerns. Presently known seal designs for allowing such cooling include the use of "tiger stripe" features or other features on the adjacent components between which a seal extends, to defeat the seal and allow cooling medium to flow around the seal. However, such features may generally result in uncontrollable leakage and non-uniform heat transfer coefficients, and are generally non-predictive in terms of the amount of cooling medium allowed to flow around the seal.

Accordingly, improved sealing devices for providing a seal between adjacent components in a turbomachine are desired in the art. In particular, sealing devices which provide improved leakage control and heat transfer coefficient uniformity, and which facilitate predictive cooling, would be advantageous.

BRIEF DESCRIPTION OF THE INVENTION

Aspects and advantages of the invention will be set forth in part in the following description, or may be obvious from the description, or may be learned through practice of the invention.

In one embodiment, the present disclosure is directed to a sealing device for providing a seal between adjacent components. The sealing device includes a seal plate insertable between the adjacent components, the seal plate comprising a first face and an opposing second face. The sealing device further includes a plurality of pins extending from one of the first face or the second face, the plurality of pins configured to space the one of the first face or the second face from contact surfaces of the adjacent components.

In another embodiment, the present disclosure is directed to a turbomachine. The turbomachine includes a first component and a second adjacent component, the first and second components defining a gap therebetween, each of the first and second components defining a slot, the slot comprising a contact surface. The turbomachine further includes a sealing device disposed in the gap and providing a seal between adjacent components. The sealing device includes a seal plate disposed within the slots of the first and second components and extending across the gap, the seal plate comprising a first face and an opposing second face. The sealing device further includes a plurality of pins extending from one of the first face or the second face, the plurality of pins spacing the one of the first face or the second face from the contact surfaces of the slots.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
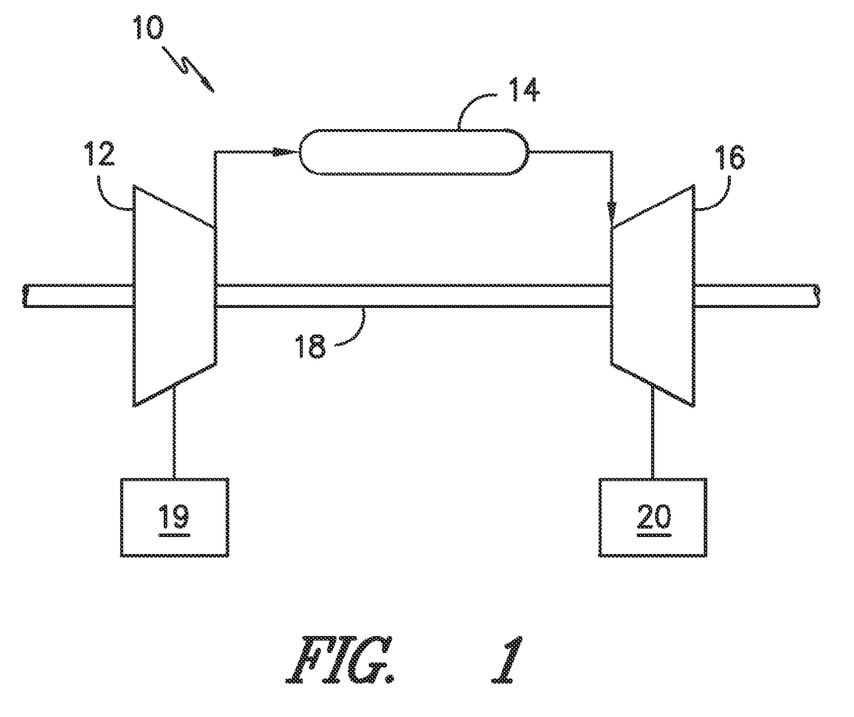
FIG. 1 is a schematic illustration of a turbomachine according to one embodiment of the present disclosure.

FIG. 1 is a schematic diagram of a turbomachine, which in the embodiment shown is a gas turbine system 10. It should be understood that the turbomachine of the present disclosure need not be a gas turbine system 10, but rather may be any suitable turbine system or other turbomachine, such as a steam turbine system or other suitable system. The system 10 as shown may include a compressor section 12, a combustor section 14 which may include a plurality of combustors as discussed below, and a turbine section 16. The compressor section 12 and turbine section 16 may be coupled by a shaft 18. The shaft 18 may be a single shaft or a plurality of shaft segments coupled together to form shaft 18. The shaft 18 may further be coupled to a generator or other suitable energy storage device, or may be connected directly to, for example, an electrical grid. An inlet section 19 may provide an air flow to the compressor section 12, and exhaust gases may be exhausted from the turbine section 16 through an exhaust section 20 and exhausted and/or utilized in the system 10 or other suitable system. Exhaust gases from the system 10 may for example be exhausted into the atmosphere, flowed to a steam turbine or other suitable system, or recycled through a heat recovery steam generator.

Figure 2:
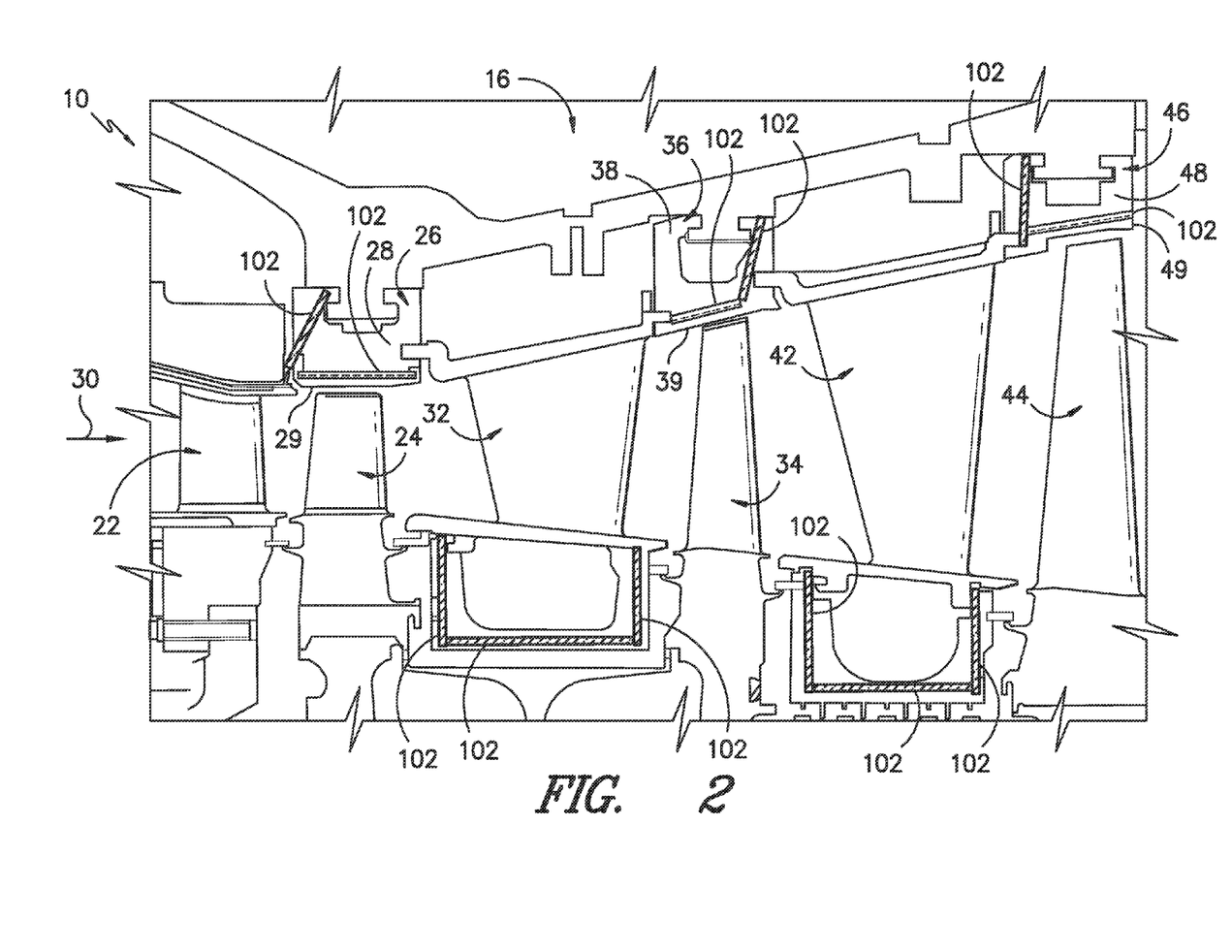
FIG. 2 is a sectional side view of the turbine section of a gas turbine system including a plurality of sealing devices according to one embodiment of the present disclosure.

The compressor 12 and the turbine 16 may each include a plurality of stages. For example, one embodiment of a turbine 16 including three stages is shown in FIG. 2. For example, a first stage of the turbine 16 may include an annular array of nozzles 22 and an annular array of buckets 24. The nozzles 22 may be disposed and fixed circumferentially about the shaft 18. The buckets 24 may be disposed circumferentially about the shaft 18 and coupled to the shaft 18. A shroud assembly 26, formed by an annular array of support members 28 and shroud blocks 29, may surround the buckets 24 and be connected to the nozzles 22 to partially define hot gas path 30. A second stage of the turbine 16 may be disposed downstream of the first stage and include similarly disposed nozzles 32, buckets 34, and shroud assemblies 36 formed by support members 38 and shroud blocks 39 and partially defining hot gas path 30. A third stage of the turbine 16 may be disposed downstream of the second stage and may include similarly disposed nozzles 42, buckets 44, and shroud assemblies 46 formed by support members 48 and shroud blocks 49 and partially defining hot gas path 30. Spacer wheels 50 and inner shroud assemblies 52 may additionally be included in various stages and partially define the hot gas path 30. It should be understood that neither the turbine 16 nor the compressor 12 is limited to three stages, but rather that any suitable number of stages is within the scope and spirit of the present disclosure. Further, it should be understood that the various components of the turbine 16 need not be arranged as described above, and rather that any suitable arrangement of components in a turbine 16, compressor 12, or system 10 in general is within the scope and spirit of the present disclosure.

Various adjacent components of the turbine 16 as shown in FIG. 2, various adjacent components of the compressor 12, such as buckets, nozzles, shroud components, spacer wheels, and/or various adjacent components of the system 10 in general, may define gaps 100 therebetween. These gaps may allow for the leakage of hot gas or cooling fluid therethrough, thus reducing the efficiency and output of the system 10.

Figure 3:
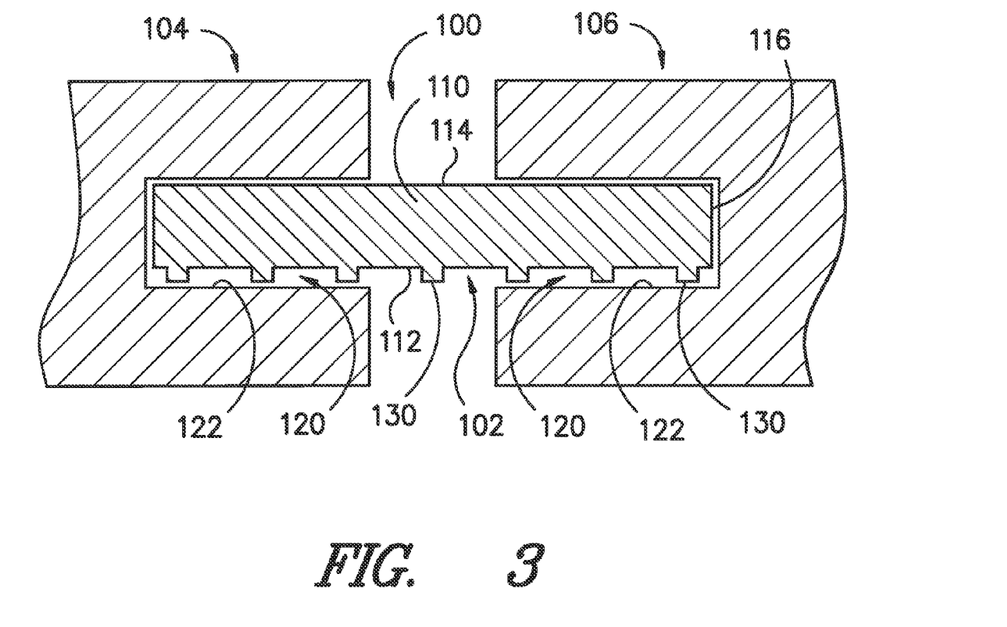
FIG. 3 is a side cross-sectional view of a sealing device sealing a gap between adjacent components according to one embodiment of the present disclosure.
Figure 4:
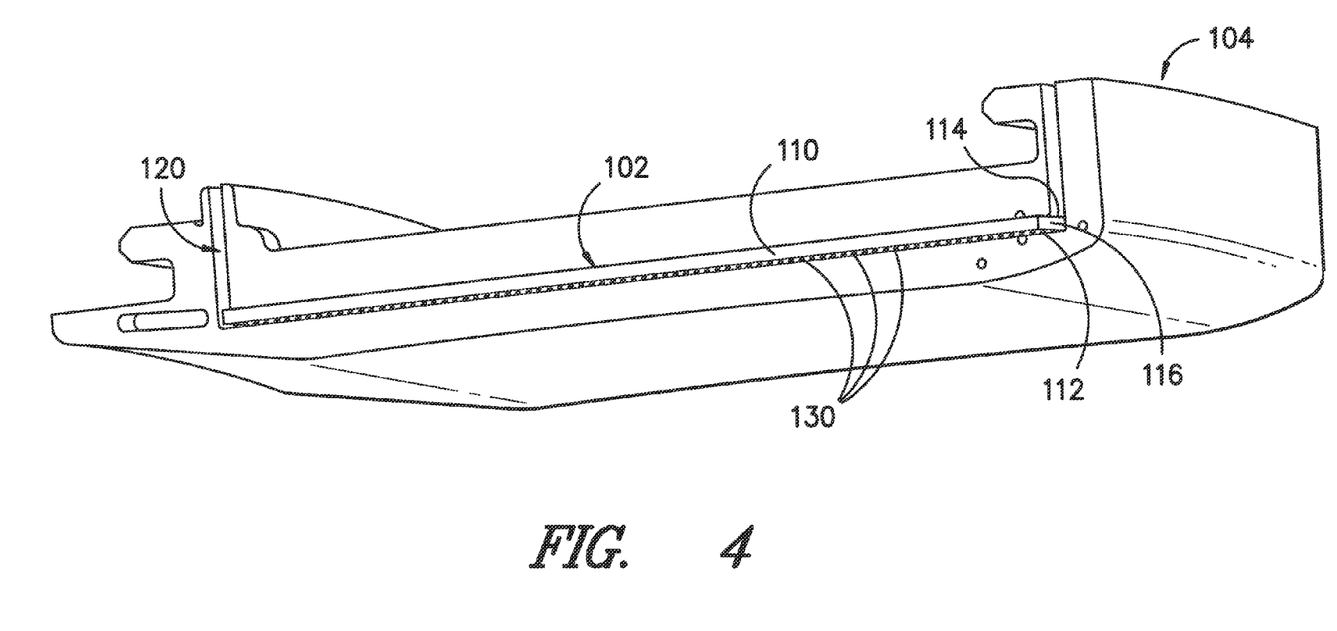
FIG. 4 is a perspective view of a sealing device disposed in and extending from a sealing device according to one embodiment of the present disclosure.

Thus, improved sealing devices 102 are disclosed for providing a seal between adjacent components, such as adjacent components of a turbomachine, such as a turbine system 10. In exemplary embodiments, the adjacent components may be any components at least partially exposed to a high temperature flow of gas through the system 10. For example, a component, such as a first component 104 or adjacent second component 106 as designated in FIG. 3, may be a bucket, nozzle, shroud component, spacer wheel, transition piece, retaining ring, compressor exhaust, or any components thereof, as described above or otherwise. However, it should be understood that the present disclosure is not limited to any above disclosed components, and rather that any suitable adjacent components defining gaps 100 therebetween are within the scope and spirit of the present disclosure.

Referring now to FIGS. 3 through 10, a sealing device 102 according to the present disclosure may include various components configured to provide improved sealing in gaps 100 between adjacent components 104, 106 of a system 10. For example, sealing devices 102 according to the present disclosure may advantageously provide improved leakage control and heat transfer coefficient uniformity, and may additionally facilitate predictive cooling of the sealing device 102, the components 104, 106 which the sealing device 102 is sealing, and the associated seal region.

For example, a sealing device 102 may include a seal plate 110. The seal plate 110 may be configured to provide a seal between adjacent components 104, 106 of the turbine system 10. The seal plate 110 may have any shape and size suitable to fit in a gap 100. In exemplary embodiments, for example, the seal plate 110 may include a first outer surface or face 112, an opposed second outer surface or face 114, and an edge 116 extending therebetween. The edge 116 may at least partially define the periphery of the seal plate 110.

The seal plate 110 may in general be formed from any suitable material. For example, the seal plate 110 may be formed from a metal or metal alloy. In exemplary embodiments, the seal plate 110 may be formed from a steel alloy, such as a high temperature steel alloy. Alternatively, the seal plate 110 may be formed from any suitable material, such as a ceramic or other suitable non-metal.

As discussed above, the seal plate 110 may be configured to provide a seal between adjacent components 104, 106. For example, the seal plate 110 may be sized and shaped to cover at least a portion of a gap 100 between adjacent components 104, 106, thus at least partially blocking the leakage of flows through the gap 100. Seal plate 110 may generally be insertable between the adjacent components 104, 106, such as within slots 120 defined in the respective components 104, 106. Each slot 120 may include an inner contact surface 122 which various portions of the sealing device 102 may contact and/or be spaced from, as discussed herein. Thus, sealing device 102 and seal plate 110 thereof may be disposed in the gap 100 and within the slots 120 of the adjacent components 104, 106 to provide the seal between the components 104, 106.

As further illustrated, sealing device 102 may advantageously include a plurality of pins 130. The pins 130 may generally extend from the first face 112 or the second face 114, and as shown may be configured to space the face 112, 114 from which they extend from the contact surfaces 122 of the components 104, 106, such as the portion of the contact surfaces 122 which that face would otherwise contact. The face 112, 114 from which the pins 130 extends may in exemplary embodiments generally be oriented towards the hot gas path 30 and away from the cooling medium, such that that face 112, 114 is the loaded face or low pressure face of the sealing device 102. Pins 130 may thus allow cooling medium to flow between the pins 130 and around the seal plate 110 to thus provide desired cooling of the sealing device 102, the components 104, 106, and the sealing region generally.

Pins 130 may generally be sized, shaped, located and spaced to provide optimal sealing and cooling properties for the specified associated components 104, 106. For example, in some embodiments, pins 130 may have generally uniform sizes, shapes, and spacing therebetween. In other embodiments, the sizes, shapes and spacing may vary to provide particular cooling at desired locations and regions of the sealing device 102 and associated components 104, 106. The sizing and shapes of individual pins 130 may additionally vary, such as from the root of the pin 130 at the face 112, 114 to the distal end of the pin 130, etc.

Further, pins 130 may be formed using any suitable techniques or apparatus. In some exemplary embodiments, pins 130 may be integral with the seal plate 110. Pins 130 may thus for example be formed through direct metal laser melting ("DMLM"), electrical discharge machining ("EDM"), milling, stamping, or other suitable material removal or alternation technique. In other embodiments, pins 130 may be formed separately from seal plate 110, and may be connected to seal plate 110 by welding, brazing, use of a suitable adhesive, mechanical connection, or any other suitable connection apparatus or technique.

Pins 130 in generally may be relatively small, and referred to as micro-pins. For example, in some embodiments, one or more pins 130 may have a maximum height 132 of less than or equal to approximately 0.01 inches, such as less than or equal to approximately 0.005 inches. Further, in some embodiments, one or more pins 130 may have a maximum width 134 (which may be a diameter or maximum diameter for, for example, cylindrical pins or pins with oval or circular cross-sections) of less than or equal to approximately 0.02 inches, such as less than or equal to approximately 0.015 inches, such as between approximately 0.015 inches and approximately 0.005 inches.

Figures 5, 6:
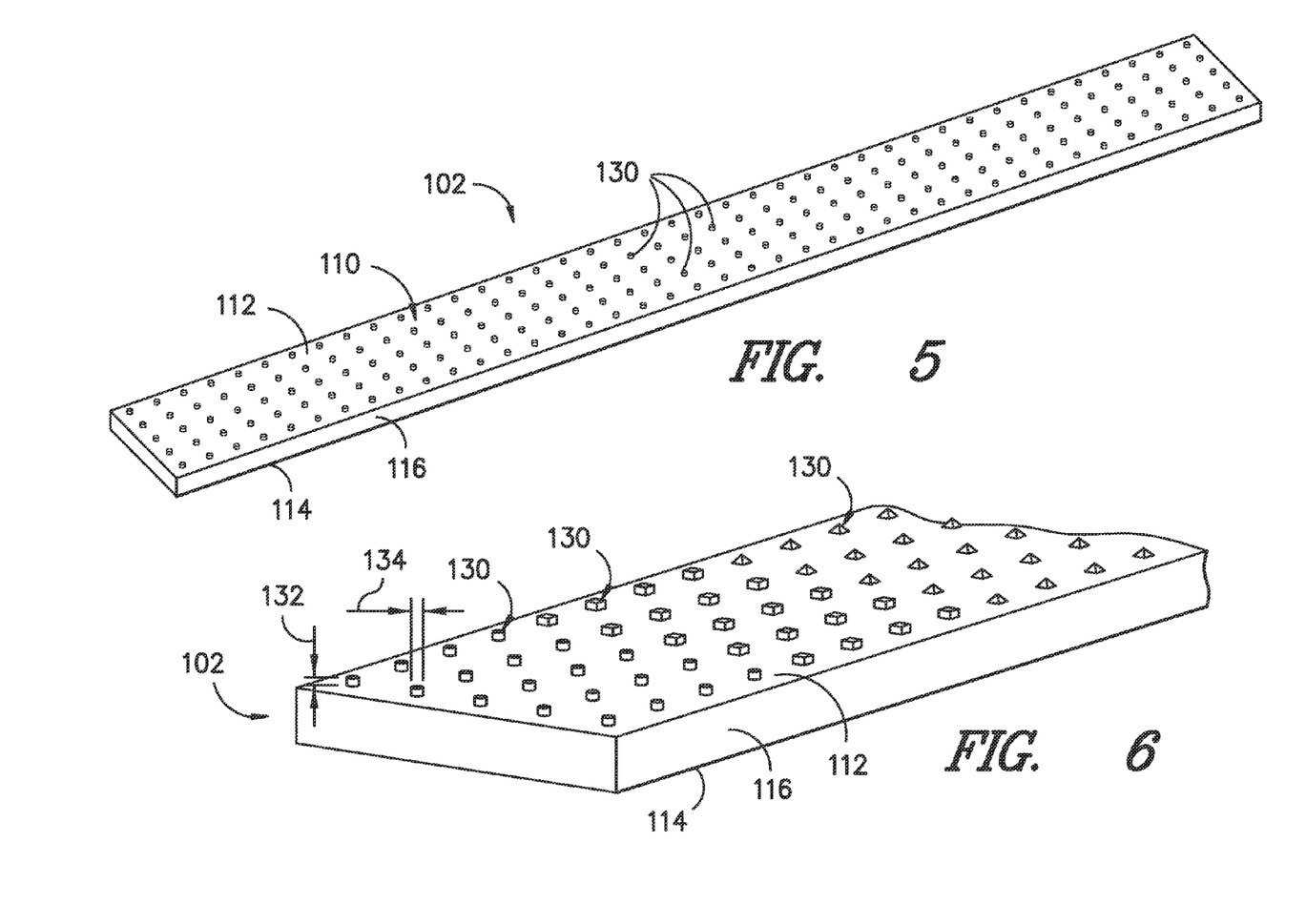
FIG. 5 is a perspective view of a sealing device according to one embodiment of the present disclosure.
FIG. 6 is a close-up perspective view of a sealing device according to one embodiment of the present disclosure.

Pins 130 may further have any suitable shapes. For example, as illustrated in FIG. 5, one or more pins 130 may be generally cylindrical, or generally non-cylindrical. For example, non-cylindrical pins 130 may be rectangular (illustrated), conical, pyramidal (illustrated), prism-shaped, or any other suitable shape.

Figures 7, 8:
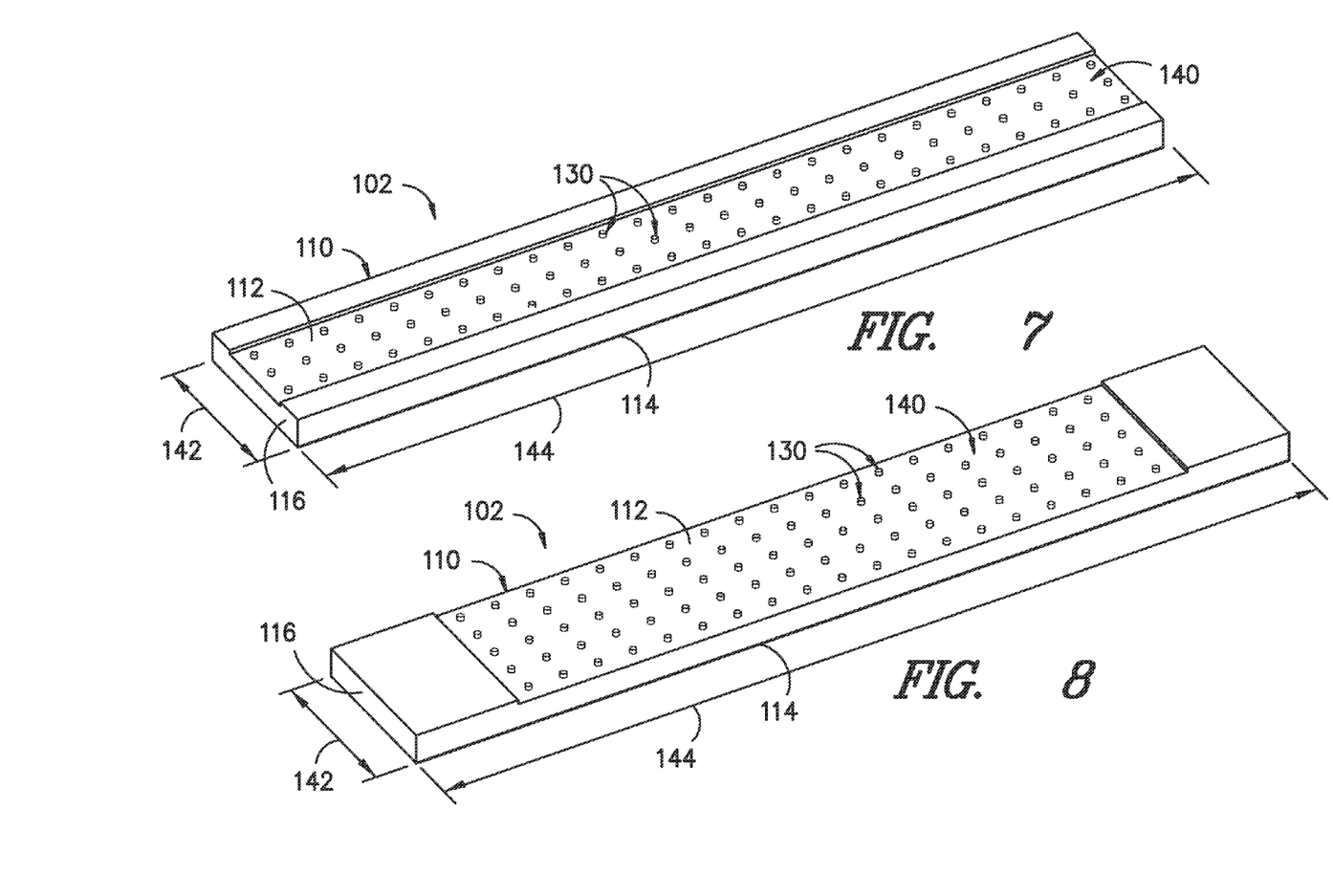
FIG. 7 is a perspective view of a sealing device according to another embodiment of the present disclosure.
FIG. 8 is a perspective view of a sealing device according to another embodiment of the present disclosure.

FIGS. 3 through 6 generally illustrate pins 130 extending from and spaced about a face 112, 114, such as face 112 as illustrated. In some embodiments as illustrated in FIGS. 7 and 8, pins 130 may be located in a specified portion of a face 112, 114. For example, as illustrated, a channel 140 may be defined in the face 112, 114 from which the pins 130 extend. The pins 130 may be disposed within the channel 140, and extend from the portion of the face 112, 114 included in the channel 140. In some embodiments no pins 130 may extend from portions of the face 112, 114 outside of the channel 140, while in other embodiments pins 130 may extend from these portions of the face 112, 114.

A channel 140 may extend in any suitable direction. For example, the seal plate 110 may define a width 142 and a length 144. In some embodiment as illustrated in FIG. 7, channel 140 may extend along the length 144, while in other embodiments as illustrated in FIG. 8, channel 140 may extend along the width 142. In still other embodiments, a channel 140 may extend at an angle to the width 142 and/or length 144, and/or may have any suitable linear or non-linear path.

In some embodiments, a sealing device 102 according to the present disclosure may simply include a seal plate 110 and a plurality of pins 130 extending therefrom. In other embodiments, however, a sealing device 102 may include additional components. For example, referring now to FIGS. 9 and 10, in some embodiments a sealing device 102 may include an auxiliary seal member 150. As illustrated, auxiliary seal member 150 may be disposed on one or more of the pins 130, such as on distal ends 152 thereof. The auxiliary seal member 150 may thus be spaced from the seal plate 110, and may for example be configured to contact the contact surfaces 122 of the slots 120 of the adjacent components 104, 106.

Auxiliary seal members 150 may advantageously protect pins 130 from wear and/or enhance cooling of the sealing device 102 as well as the components 104, 106 which the sealing device 102 is sealing and the associated seal region. Auxiliary seal members 150 may for example be formed integrally on/with pins 130 through direct metal laser melting ("DMLM"), electrical discharge machining ("EDM"), milling, stamping, or other suitable material removal or alternation technique. Alternatively, auxiliary seal members 150 may be formed separately from pins 130, and may be connected to pins 130 by welding, brazing, use of a suitable adhesive, mechanical connection, or any other suitable connection apparatus or technique.

Figure 9:
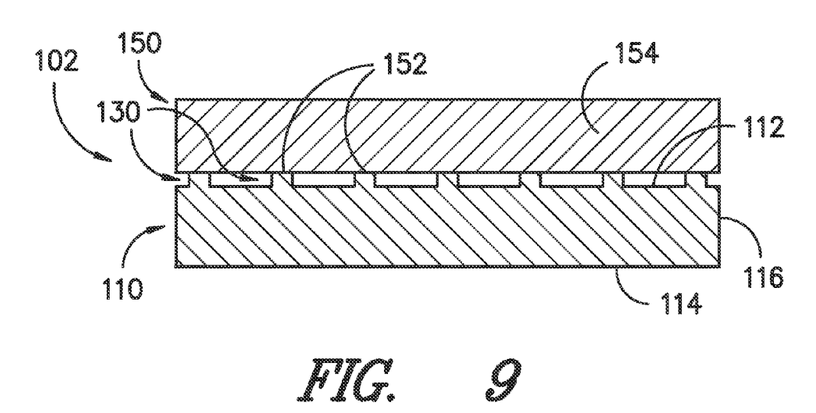
FIG. 9 is a side view of a sealing device according to another embodiment of the present disclosure.

In some embodiments as illustrated in FIG. 9, auxiliary seal member 150 may be a second seal plate 154. Second seal plate 154 may generally have seal plate characteristics as discussed herein with respect to the seal plate 110, and may be identical to or different than the seal plate 110.

Figure 10:
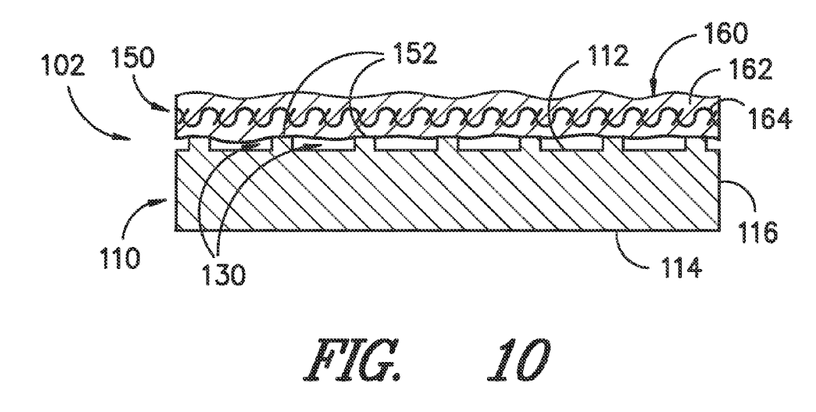
FIG. 10 is a side view of a sealing device according to another embodiment of the present disclosure.

In other embodiments as illustrated in FIG. 10, auxiliary seal member 150 may include a cloth layer 160, which may for example protect the pins 130 and the sealing device 102 generally from mechanical wear, etc. The cloth layer 160 may generally include a cloth 162 formed from a suitable fabric, and may further include a plurality of strands 164 embedded in the cloth 162. Strands 164 may be formed from any suitable materials, such as in exemplary embodiments a suitable metal or metal alloy or alternatively a ceramic or polymer. Further, strands 164 may be woven, knitted, pressed, or otherwise embedded into the cloth 162. Strands 164 themselves may be separate individual strands, or may be grouped together as, for example, rovings, etc.

In still other embodiments (not shown), an auxiliary seal member 150 may include for example a wire mesh, which may include and be formed from a plurality of woven or non-woven strands, and may thus define a plurality of voids between the various strands. The strands 82 may be, for example, metallic strands, non-metallic strands, or a combination of metallic and non-metallic strands. Further, a sealant may be applied to the wire mesh such that the sealant impregnates the wire mesh. Impregnating of the wire mesh, according to the present disclosure, means generally filling at least a portion of the voids defined by the wire mesh. Thus, after the sealant is applied to the wire mesh, the sealant may impregnate the wire mesh such that at least a portion of the plurality of voids, or substantially all of the plurality of voids, comprise the sealant therein. In exemplary embodiments, the sealant may be a high temperature sealant. Further, in some embodiments, the sealant may include a clay, such as kaolinite or any other suitable clay. For example, in one exemplary embodiment, the sealant may include kaolinite, epoxy novolak resin, aluminum powder or aluminum-containing powder, and calcium carbonate. In another exemplary embodiment, the sealant may include kaolinite, sodium acrylate, and quartz.

It should be understood that the present disclosure is not limited to the above disclosed auxiliary seal member embodiments, and rather that any suitable auxiliary seal member disposed on pins 130 and spaced from seal plate 110 is within the scope and spirit of the present disclosure.

As discussed, sealing devices 102 according to the present disclosure advantageously include features, such as pins 130, which provide improved leakage control and heat transfer coefficient uniformity, and may additionally facilitate predictive cooling of the sealing device 102, the components 104, 106 which the sealing device 102 is sealing, and the associated seal region. Such advantageous leakage control and targeted cooling is due at least in part to the sizing, shaping, locations, spacing, and other characteristics of pins 130 as disclosed herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A sealing device for providing a seal between adjacent components, the sealing device comprising:
   seal plate insertable between the adjacent components, the seal plate comprising a first face and an opposing second face and an edge defining a periphery of the seal plate, the seal plate defining a width and a length; and
   a plurality of pins extending from one of the first face or the second face, the plurality of pins spaced apart from the edge of the seal plate and spaced apart from one another along the width and the length of the seal plate to define space for a cooling medium to flow between the plurality of pins, the plurality of pins configured to space the one of the first face or the second face from contact surfaces of the adjacent components,
   wherein the plurality of pins and the seal plate are made as one continuous piece of material; and
   wherein the plurality of pins are arranged in at least three rows of pins and at least three columns of pine.

2. The sealing device of claim 1, wherein a channel is defined in the one of the first face or the second face, the plurality of pins disposed within the channel, and wherein the channel extends along the length of the seal plate.

3. The sealing device of claim 1, wherein a channel is defined in the one of the first face or the second face, the plurality of pins disposed within the channel, and wherein the channel extends along the width of the seal plate.

4. The sealing device of claim 1, further comprising an auxiliary seal member disposed on the plurality of pins and spaced from the seal plate, the auxiliary seal member configured to contact the contact surfaces of the adjacent components.

5. The sealing device of claim 4, wherein the auxiliary seal member is a second seal plate.

6. The sealing device of claim 4, wherein the auxiliary seal member comprises a cloth layer, the cloth layer comprising a cloth and a plurality of metallic strands embedded in the cloth.

7. The sealing device of claim 1, wherein each of the plurality of pins has a maximum height of less than or equal to approximately 0.01 inches.

8. The sealing device of claim 1, wherein each of the plurality of pins has a maximum width of less than or equal to approximately 0.02 inches.

9. The sealing device of claim 1, wherein each of the plurality of pins is generally cylindrical.

10. The sealing device of claim 1, wherein each of the plurality of pins is generally pyramidal.

11. The sealing device of claim 1, further comprising an auxiliary seal member disposed on distal ends of the plurality of pins such that the auxiliary seal member is spaced from the one of the first face or the second face from which the plurality of pins extend.

12. A turbomachine, comprising:
    a first component and a second adjacent component, the first and second components defining a gap therebetween, each of the first and second components defining a slot, the slot comprising a contact surface; and
    a sealing device disposed in the gap and providing a seal between adjacent components, the sealing device comprising:
       a seal plate disposed within the slots of the first and second components and extending across the gap, the seal plate comprising a first face and an opposing second face and an edge defining a periphery of the seal plate, the seal plate defining a width and a length; and
       a plurality of pins extending from one of the first face or the second face, the plurality of pins spaced apart from the edge of the seal plate and spaced apart from one another along the width and the length of the seal plate to define a space for a cooling medium to flow between the plurality of pins, the plurality of pins spacing the one of the first face or the second face from the contact surfaces of the slots,
    wherein the plurality of pins and the seal plate are made as one continuous piece of material; and
    wherein each of the plurality of pins is generally cylindrical.

13. The turbomachine of claim 12, further comprising an auxiliary seal member disposed on the plurality of pins and spaced from the seal plate, the auxiliary seal member configured to contact the contact surfaces of the adjacent components.

14. The turbomachine of claim 13, wherein the auxiliary seal member is a second seal plate.

15. The turbomachine of claim 13, wherein the auxiliary seal member comprises a cloth layer, the cloth layer comprising a cloth and a plurality of metallic strands embedded in the cloth.

16. The turbomachine of claim 12, wherein each of the plurality of pins has a maximum height of less than or equal to approximately 0.01 inches.

17. The turbomachine of claim 12, wherein each of the plurality of pins has a maximum width of less than or equal to approximately 0.02 inches.

18. A sealing device for providing a seal between adjacent components, the sealing device comprising:
- seal plate insertable between the adjacent components, the seal plate comprising a first face and an opposing second face and an edge defining a periphery of the seal plate, the seal plate defining a width and a length; and
- a plurality of pins extending from one of the first face or the second face, the plurality of pins spaced apart from the edge of the seal plate and spaced apart from one another along the width and the length of the seal plate to define space for a cooling medium to flow between the plurality of pins, the plurality of pins configured to space the one of the first face or the second face from contact surfaces of the adjacent components,
- wherein the plurality of pins and the seal plate are made as one continuous piece of material; and
- wherein a channel is defined in the one of the first face or the second face, the plurality of pins disposed within the channel.

19. The sealing device of claim 18, wherein the channel extends along the length of the seal plate.

20. The sealing device of claim 18, wherein the channel extends along the width of the seal plate.

\* \* \* \* \*